July 13, 1943.　　　G. E. PORTER　　　2,324,173
BELLOWS
Filed Dec. 3, 1941
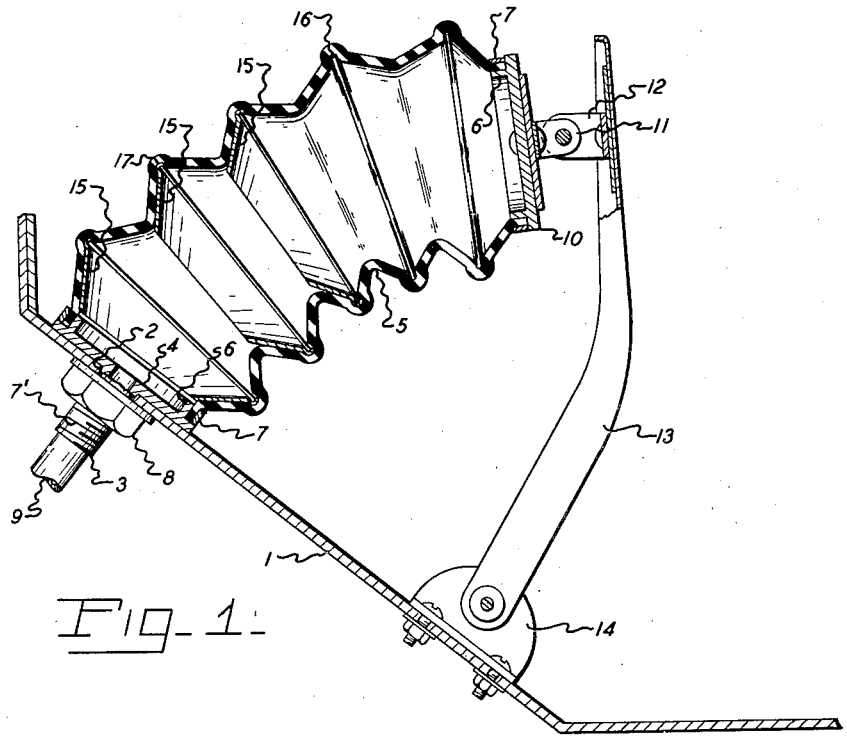
Fig. 1.
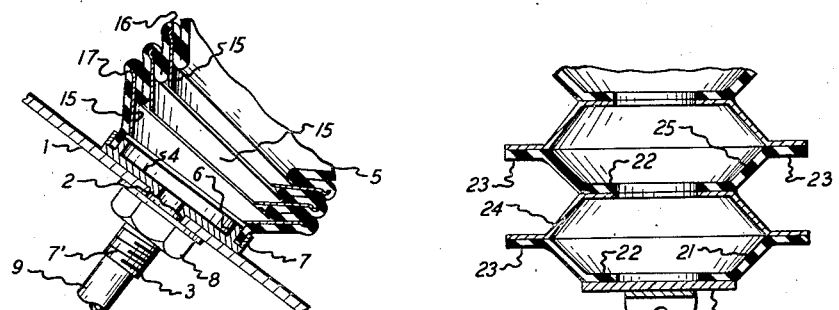
Fig. 2.
Fig. 3.
Inventor
GILBERT E. PORTER
By Beaman & Langford
Attorneys Patented July 13, 1943

2,324,173

UNITED STATES PATENT OFFICE 2,324,173

BELLOWS

Gilbert E. Porter, Mount Clemens, Mich.

Application December 3, 1941, Serial No. 421,447

4 Claims. (Cl. 137—156.5)

The present invention relates to flexible bellows, and more particularly to bellows which are adapted to have the interior thereof connected to a source of suction for the purpose of moving some operative mechanism upon the collapsing of the bellows.

Bellows of the general type to which the present invention is directed are generally provided with annular corrugations. In such bellows unless the walls thereof are made unduly heavy, there is a tendency for the central portion of the bellows to twist out of its normal position under extremely low pressures within it and under a heavy load. In other words, there is a tendency for the corrugations thereof midway between the two ends of the bellows to twist, so that a plane passing through the high points of corrugations extends in a direction out of perpendicular to the axis of the bellows. When such distortion of the bellows occurs, it seriously interferes with the proper operation of the bellows as will be apparent.

The present invention consists of an arrangement for eliminating the above described difficulty by providing within the bellows at the portion thereof subject to the distortion frustoconical sheet metal members. These members not only serve to prevent distortion of the bellows, but also nest within one another as the bellows collapses.

An object of the present invention is to prevent the distortion and twisting of bellows under extreme loads by providing an internal support therefor.

Another object of the invention is to provide internal reinforcing means for corrugated bellows in the form of frustoconical sheet material members.

Still another object of the invention is to provide internal reinforcing members for corrugated bellows, wherein the reinforcing members are anchored to the bellows at the annular high points thereof.

These and other objects residing in the arrangement, combination and construction of the part will be apparent from the following specification when taken with the accompanying drawing, in which Fig. 1 is a sectional view of the bellows according to the present invention in extended position, Fig. 2 is a partial cross section of the bellows illustrated in Fig. 1, showing the same in collapsed position, and Fig. 3 is a section of another form of the invention.

Referring particularly to the drawing, the reference character 1 illustrates a suitable stationary support in the form of a bar, strip or sheet of rigid material. The support 1 is provided with an opening 2, through which extends a nipple 3 integral with an end cap or head 4 of a corrugated bellows 5 constructed of some flexible material such as rubber. The head 4 is provided with an annular shoulder 6, about which one end of the bellows 5 is disposed. A ring 7 is provided to clamp the ends of the bellows 5 against the annular shoulder 6. The nipple 3 is provided with external threads 7' on which is screwed a nut 8 for drawing the head 4 against the support 1 and holding it rigidly with respect thereto. A tube 9 is suitably connected to the nipple 3.

The opposite end of the bellows 5 is provided with a head 10 similar in construction to the head 4. Connected to the outer side of the head 10 is provided an eye 11 to which is suitably pivoted a clevis 12, the clevis 12 being fixed to an arm 13. The arm 13 as shown is pivoted to a bracket 14 mounted on the support 1.

The specific heads 4 and 10 are merely shown for purposes of illustration. Likewise the nipple 3 and tube 9 specific connections are illustrated solely for the purpose of disclosing one way in which a source of vacuum may be connected to the interior of the bellows 5. So also the arm 13 is provided solely for the purpose of showing a member which may be a part of some operative mechanism which is controlled by the bellows 5.

It will be evident that when suction is connected with the interior of the bellows 5 through the tube 9 and nipple 3, the bellows 5 will collapse to swing the arm 13 in a counterclockwise direction. In order to prevent the corrugations of the bellows 5 from swinging out of planes normal to the axis of the bellows 5, I have provided a plurality of sheet metal frustoconical members 15 of a size to substantially fit the interior surface of one side wall of each corrugation of the bellows 5. It will be understood that the members 15 may be of other metal than sheet metal, as for instance they may be of fiber, of a plastic, or of any other suitable material. In order to anchor the members 15 within the bellows 5, the annular high point of each convolution of the bellows is interiorly recessed to provide an annular inwardly opening but outwardly extending pocket 16, and each member 15 is provided at its large end with an outwardly extending bead 17. The beads 17 fit within the pockets 16, as disclosed in the drawing, and increase the difficulty of the accidental displacement of the members 15 from their desired position.

The members 15 should all face in one direction so that upon the collapsing of the bellows, as disclosed particularly in Fig. 2, the members 15 will nest one within the other. Also the members 15 need be placed only in that portion of the bellows 5 most likely to become distorted. Thus, as shown in Fig. 1, only three of the corrugations are provided with members 15. It will be appreciated that the members 15 do not restrict the flow of air within the bellows 5, and not only serve to prevent undue collapsing of the bellows 5 in a radial direction, but also serve to guide the various parts of the bellows into their proper nesting relation as illustrated in Fig. 2 as the bellows are axially collapsed in a desired direction.

In the specification and claims it is contemplated that the moving head 10 of the bellows may move along a line in alignment with the longitudinal axis of the fixed head 4, or it may swing about an arc as in the case disclosed in Fig. 1. Thus any reference to the axis of the bellows in the specification and claims may refer to either a straight or a curved line. While the bellows 5 has been disclosed as being circular in cross section, it will be understood that the cross-sectional shape of the bellows 5 may be other than circular, as for instance square, or rectangular. Accordingly, it is contemplated that the term "annular" when used in the claims should be broadly construed as meaning ring shaped, whether the ring be of circular or square or rectangular configuration. Furthermore, the members 15, while shown in the drawing as being nonsymmetrical on opposite sides, may be fully symmetrical. In other words the base angles of opposite sides of sections thereof may be of equal size.

In Fig. 3 another form of the invention is disclosed. In this form the bellows is made up of alternate rubber and metal members. Referring particularly to Fig. 3, a head 20 is provided with a rubber member 21 in the form of a truncated cone having end flanges 22 and 23. It will be understood that if the bellows is not circular, the member 21 would be in the form of a truncated pyramid. The flange 22 is suitably bonded to the head 20 and the flange 23 is bonded to a sheet metal truncated member 24, having substantially the same shape as the member 21, but being inverted. Bonded to the sheet metal truncated member 24 is a rubber truncated member 25. In this manner alternate rubber and metal truncated members are bonded together to provide a bellows. It will be apparent that alternate truncated members form reinforced bellows members similar in nature as far as operative relation is concerned with the reinforced bellows disclosed in Figs. 1 and 2. However, the structure disclosed in Fig. 3 has a particular advantage that the rubber overlying the reinforcing members 15 of the form of the invention disclosed in Figs. 1 and 2 is eliminated.

It is contemplated that changes may be made from the specific embodiments of the invention disclosed without department from the spirit or substance of the broad invention. Accordingly, I do not wish to be limited except by the scope of the following claims.

This application is a continuation in part of application Serial No. 308,505 filed December 11, 1939.

I claim.

1. In combination with a bellows formed from flexible material to provide a series of corrugations arranged transversely thereof, means reinforcing said bellows against collapse comprising a rigid hollow frustoconical member positioned interiorly of said bellows and with the large end thereof received by the interior wall of the bellows at the high point of a corrugation therein.

2. In combination with a bellows formed from flexible material and providing a series of circumferentially directed axially spaced corrugations in the length thereof, means internally reinforcing said bellows against collapse comprising a rigid hollow frustoconical member arranged in each of one or more of said corrugations, the large end of each of said members being engaged by the inner walls of said bellows adjacent the high point of the corresponding corrugation thereof and the body of each of said members extending in inwardly supporting relation with respect to one side wall only of the corresponding corrugation.

3. In combination with a flexible bellows formed to provide a plurality of circumferentially directed corrugations spaced longitudinally of said bellows from one another, means for internally reinforcing said bellows against collapse comprising a plurality of internal, hollow, rigid reinforcing members each engaging an inner wall portion of said bellows to restrain radial inner collapsing movement of said bellows over the area of said engagement, said members being axially elongated and constructed and arranged for nesting relation with respect to each other upon axial collapse of said bellows.

4. In combination with a bellows formed from a flexible material to provide a series of corrugations arranged transversely thereof, said corrugations having at the high points thereof inner annular pockets opening inwardly, means reinforcing said bellows against collapse comprising a plurality of rigid sheet material frustoconical members, said members each having at the large end thereof an outwardly extending annular bead, said members being positioned interiorly of said bellows with the beads thereof within said annular pockets respectively and with the walls thereof respectively adjacent the interior walls of said corrugations.

GILBERT E. PORTER.